(12) United States Patent
Ivaldi et al.

(10) Patent No.: US 7,457,256 B2
(45) Date of Patent: Nov. 25, 2008

(54) LOCAL AREA NETWORK WITH ONE OR MORE VIRTUAL GROUPS OF CORE EQUIPMENTS APPROPRIATE FOR LAYER 2 SWITCHING

(75) Inventors: Guillaume Ivaldi, Agoura Hills, CA (US); Steve Melahn, Sherman Oaks, CA (US)

(73) Assignee: ALCATEL, Paris (FR)

( * ) Notice: Subject to any disclaimer, the term of this patent is extended or adjusted under 35 U.S.C. 154(b) by 673 days.

(21) Appl. No.: 11/185,789

(22) Filed: Jul. 21, 2005

(65) Prior Publication Data

US 2006/0018302 A1 Jan. 26, 2006

(30) Foreign Application Priority Data

Jul. 22, 2004 (FR) .................................. 04 51627

(51) Int. Cl.
*H04L 12/28* (2006.01)
*H04L 12/50* (2006.01)
*G06F 12/00* (2006.01)

(52) U.S. Cl. ...................... 370/256; 370/360; 370/386; 370/396; 370/406; 709/226

(58) Field of Classification Search ......... 370/252–256, 370/228, 242, 244, 351–356, 360, 386, 388, 370/389, 396, 399, 400–401, 406–409; 709/224–239
See application file for complete search history.

(56) References Cited

U.S. PATENT DOCUMENTS

| | | | | |
|---|---|---|---|---|
| 6,570,881 | B1 * | 5/2003 | Wils et al. ................ | 370/410 |
| 6,580,715 | B1 * | 6/2003 | Bare ......................... | 370/396 |
| 2003/0179707 | A1 | 9/2003 | Bare | |

* cited by examiner

*Primary Examiner*—Afsar M. Qureshi
(74) *Attorney, Agent, or Firm*—Sughrue Mion, PLLC

(57) ABSTRACT

A local area network comprises a peripheral equipment effecting layer 2 switching and including physical link aggregation means, and first and second core equipments effecting layer 2 switching and including physical link aggregation means. The peripheral equipment is connected to the first and second core equipments by first and second physical links, and the first and second core equipments are connected to each other by a third physical link. The first and second core equipments also respectively comprise first and second management means each adapted to detect the presence of the core equipment in which they are not installed via the third physical link coupling them and in the event of mutual detection to instruct the transmission of a common identifier to the peripheral equipment so that it considers the first and second core equipments as a single layer 2 switch and its aggregation means aggregate the first and second physical links with the aggregation means of the first and second core equipments.

19 Claims, 2 Drawing Sheets

LOCAL AREA NETWORK WITH ONE OR MORE VIRTUAL GROUPS OF CORE EQUIPMENTS APPROPRIATE FOR LAYER 2 SWITCHING

CROSS-REFERENCE TO RELATED APPLICATIONS

This application is based on French Patent Application No. 04 51 627 filed 22 Jul. 2004, the disclosure of which is hereby incorporated by reference thereto in its entirety, and the priority of which is hereby claimed under 35 U.S.C. §119.

BACKGROUND OF THE INVENTION

1. Field of the Invention

The invention relates to local area networks and more particularly to the transmission of data between peripheral equipments and core equipments each appropriate for layer 2 switching.

2. Description of the Prior Art

In the present context the expression "layer 2 switching" means switching for transmitting data in point-to-point ("unicast") mode, point-to-multipoint ("multicast") mode or multipoint-to-multipoint ("broadcast") mode. Layer 3 switching concerns routing. Of course, certain equipments, known as switches/routers, provide both layer 2 switching and layer 3 switching.

Many local area networks (LAN) have a physical architecture in which layer 2 switching peripheral equipments are connected to at least two layer 2 switching core equipments. The peripheral equipment is connected by at least one physical link to each of the two core equipments, which are also connected to each other by at least one physical link. This architecture therefore offers redundancy of the links to the peripheral equipments.

However, these redundant links allow the formation of loops that can cause the network to "crash" in the event of transmission of data in broadcast or multicast mode. To remedy this drawback it is advantageous, if not essential, to configure the peripheral and core equipments so that they use a spanning tree technique which consists in detecting and then neutralizing any layer 2 loops. To this end, in the presence of at least two redundant physical links between a peripheral equipment and two core equipments, in the peripheral equipment, one of the two physical ports respectively associated with the two links is placed in a transmission ("forwarding") mode and the other in a blocking mode for all data transmissions. Thus the data broadcast can take only the path that includes the port that is not blocked.

Because the links containing blocked ports are not used, some bandwidth is wasted. Moreover, when the link containing a port that is not blocked or the link between core equipments is interrupted, it takes a relatively long time, up to 30 seconds, for this technique to unblock another link containing a port that was previously blocked. A faster technique known as "rapid reconfiguration" has been proposed, defined by the IEEE standard 802.1D-2004, and allows link unblocking in less than one second, but as a general rule there are always links including a blocked port and thus some bandwidth is always wasted, which is the payback for providing redundancy.

To improve bandwidth use, the IEEE 802.3ad standard has been proposed, whereby the redundant links are aggregated to offer the peripheral equipment a greater data transmission capacity. This enables the implementation of a load sharing mechanism and a fast mechanism for re-establishing links in the event of an equipment failure. However, this standard requires that the aggregated redundant links terminate at the same core switch, which limits its benefit. Furthermore, this standard does not provide a solution to the problem previously referred to resulting from using the spanning tree technique.

Nortel has proposed the "Split-Multi-Link Trunking" (S-MLT) technique for aggregating links outgoing from the same peripheral equipment and terminating at two different core equipments. However, the peripheral equipment is not informed of a problem on the link between the two core equipments, with the result that some of the data transmitted using the aggregated links may be lost. Thus the integrity of the local area network is not maintained. Moreover, this is a proprietary solution. Furthermore, this technique imposes a volume of traffic between the core equipments for them to be able to synchronize their knowledge.

Hewlett Packard has proposed the "switch meshing" technique as an alternative to the spanning tree technique, enabling improved use of bandwidth. The redundant links can be used to transmit data at all times, allowing a rapid response in the event of a problem on a link. This technique is beneficial from the traffic engineering point of view, but necessitates specific processing at each equipment. Moreover, because of the complexity that it introduces into the local area networks, this technique is not readily compatible with their growth. Furthermore, it is a proprietary solution for all the equipments (peripheral equipments or core equipments). Additionally, the number of peripheral and core equipments that can offer the function is limited to 15.

Because there is no prior art technique that is entirely satisfactory, an object of the invention is to improve on the situation.

SUMMARY OF THE INVENTION

To this end the invention consists in a local area network comprising at least one peripheral equipment adapted to effect layer 2 switching and including physical link aggregation means, and at least first and second core equipments also adapted to effect layer 2 switching and including physical link aggregation means, the peripheral equipment being connected to the first and second core equipments respectively by at least first and second physical links, and the first and second core equipments being connected to each other by at least one third physical link.

In this network the first and second core equipments respectively comprise first and second management means each adapted to detect the presence of the core equipment in which they are not installed (via the third physical link coupling them) and in the event of mutual detection to instruct the transmission of a common identifier to the peripheral equipment so that it considers the first and second core equipments as a single layer 2 switch and its aggregation means aggregate the first and second physical links with the aggregation means of the first and second core equipments.

The common identifier may be predetermined. In this case, it is stored in memories of each of the first and second management means, for example. Alternatively the common identifier may be conjointly determined by the first and second management means during a negotiation procedure.

Furthermore, in the absence of detection, the first and second management means may each be adapted to instruct the transmission to the peripheral equipment of the personal identifier of the core equipment in which they are respectively installed.

Additionally, the peripheral equipment may be equipped with auxiliary management means responsible for implementing a spanning tree type technique to manage access to the first and second physical links. In this case in the event of an aggregate of links being established after the transmission of a common identifier, the auxiliary management means are arranged so as to be placed in a transmission mode authorizing the transmission of data over the first and second physical links.

Moreover, if the first and second core equipments are also connected by at least one fourth physical link, it is advantageous if they are each equipped with auxiliary management means implementing a spanning tree type technique enabling them to manage access to the third and fourth physical links. In this case, if an aggregate of links has been established with the third and fourth physical links by the aggregation means of the first and second core equipments the auxiliary management means of the first and second core equipments are preferably adapted to instruct the auxiliary management means of the latter to be placed in a transmission mode authorizing the transmission of data over the third and fourth physical links.

Other features and advantages of the invention will become apparent on reading the following detailed description and examining the appended drawings.

DETAILED DESCRIPTION OF THE PREFERRED EMBODIMENTS

The appended drawings constitute part of the description of the invention as well as, if necessary, contributing to the definition of the invention.

An object of the invention is to enable general optimization of the use of bandwidth in local area networks (LAN), both in normal operation and in degraded operation following failure of a link.

The invention relates to any type of local area network, being independent of the medium or media used. Thus the network could be a copper wire or fiber optic network or an Ethernet network.

Figure 1:
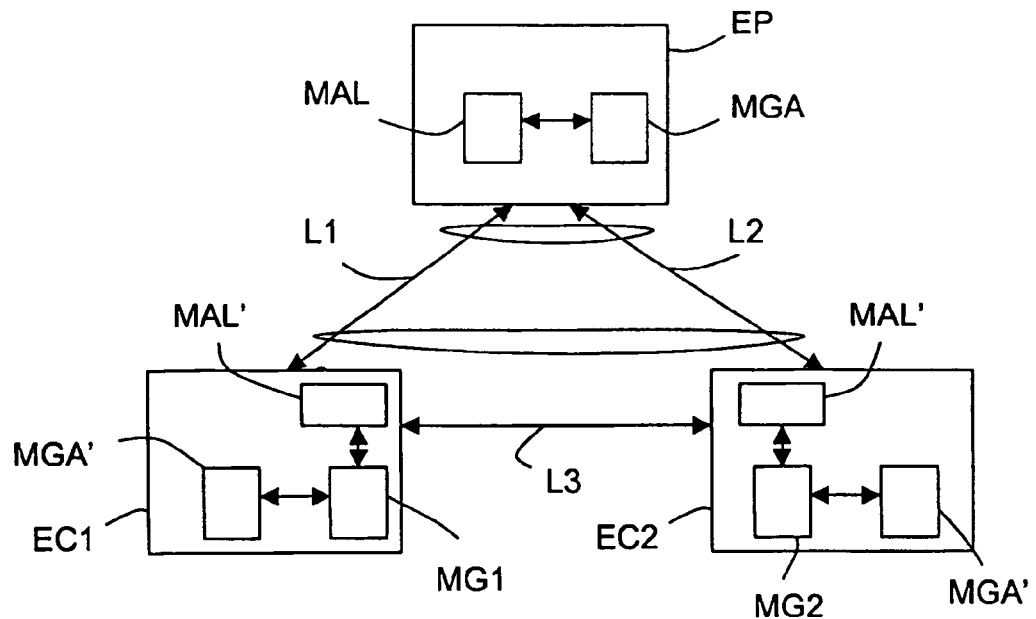
FIG. 1 is a diagram of a portion of a first example of a local area network of the invention.

A first example of a local area network of the invention is described first with reference to FIG. 1.

A local area network of the invention comprises, firstly, at least one peripheral equipment EP capable of effecting layer 2 switching as defined in the introductory part of this description and comprising a physical link aggregation module MAL and, secondly, at least first and second core equipments EC1 and EC2, also each capable of effecting layer 2 switching and each comprising a physical link aggregation module MAL'.

In the present context the expression "physical link aggregation module" means a module operating in accordance with the IEEE 802.3ad standard to enable the dynamic aggregation of physical links between the equipment in which it is installed and a remote other equipment.

For example, the peripheral equipment EP constitutes a layer 2 switch. Moreover, the first and second core equipments EC1 and EC2 may be either layer 2 switches or combined layer 2 switches and layer 3 routers (switches/routers). Each equipment, whether it be a peripheral equipment EP or a core equipment EC1, EC2, has its own chassis identifier, which is used in particular to identify it.

The peripheral equipment EP is connected, firstly, to the first core equipment EC1 by at least one first physical link L1 and, secondly, to the second core equipment EC2 by at least one second physical link L2. Of course, the peripheral equipment EP could be connected to at least one of the first and second core equipments EC1 and EC2 by a plurality of (at least two) physical links.

Moreover, the first and second core equipments EC1 and EC2 are connected to each other by at least one third physical link L3. Of course, the first and second core equipments EC1 and EC2 could be connected to each other by a plurality of (at least two) physical links.

According to the invention, the first core equipment EC1 comprises a first management module MG1 responsible for detecting the presence of the second core equipment EC2 via the third physical link L3 coupling them (and any other physical links coupling them). Likewise, the second core equipment EC2 includes a second management module MG2 responsible for detecting the presence of the first core equipment EC1 via the third physical link L3 coupling them (and any other physical links coupling them).

Detection may be effected by any means known to the person skilled in the art and in particular by exchanging dedicated messages or by observation of traffic or service messages exchanged over the physical links set up between the core equipments concerned. For example, the AMAP topology protocol (from Alcatel) or the NDP topology protocol may be used.

Each management module MG1, respectively MG2, is adapted, when it has detected the presence of a remote core equipment EC2, respectively EC1, to instruct its core equipment EC1, respectively EC2, to transmit a common identifier to the peripheral equipment EP via the first physical link L1, respectively the second physical link L2. This common identifier is a virtual chassis identifier intended to cause the peripheral equipment EP to believe that the first and second physical links L1 and L2 terminate at the same virtual layer 2 switch. This virtual layer 2 switch therefore represents a virtual group of two layer 2 switches in this example. However, it could represent more than two switches, for example if a third core equipment, also connected to the peripheral equipment EP, were disposed between the first and second core equipments EC1 and EC2.

The common identifier may be predetermined, that is to say defined in advance. It can then be stored in memories of each of the first and second management modules MG1 and MG2, for example. In this case, if the first and second management modules MG1 and MG2 mutually detect core equipments in which they are not installed, they each extract the common identifier from their memory in order to communicate it to their respective core equipment EC1, EC2 for it to be transmitted to the peripheral equipment EP via the first and second physical links L1 and L2. The memories may be read-only memories (ROM) or random access memories (RAM).

In a particularly advantageous variant, the common identifier may be determined conjointly by the first and second management modules MG1 and MG2 by means of a negotiation procedure. To be more precise, if the first and second management modules MG1 and MG2 mutually detect the core equipments in which they are not installed, they exchange dedicated negotiation messages in order to agree on a common identifier, for example one selected from a predefined list. Then, once they are in agreement, they communicate the negotiated common identifier to their respective core equipments EC1, EC2 for transmission to the peripheral equipment EP via the first and second physical links L1 and L2.

The peripheral equipment EP believing that its two physical links L1 and L2 terminate at the same (virtual) core equipment, its aggregation module MAL can then aggregate them dynamically, in cooperation with the aggregation modules MAL' of the first and second core equipments EC1 and EC2, to form a logical link in accordance with the IEEE 802.3ad standard.

The bandwidth offered by the first and second physical links L1 and L2 can then be used entirely for the transmission of data between the peripheral equipment EP and the first and second core equipments EC1 and EC2, with the certainty that the third physical link L3 is usable. In other words, there is no risk of data being lost because of a problem at the level of the third physical link L3, since the first and second management modules MG1 and MG2 mutually detect the core equipments EC2 and EC1 in which they are not installed.

Of course, the first and second management modules MG1 and MG2 perform this detection function continuously. Accordingly, if they no longer detect the core equipments EC2 and EC1 in which they are not installed, for example because of interruption of the third physical link L3, they instruct their core equipment EC1, EC2 to transmit to the peripheral equipment EP their own personal identifier, after first terminating the virtual aggregate (or virtual group) of layer 2 switches by sending a "leave" LACP-PDU (Link Aggregation Control Protocol-Packet Data Unit) packet to each of the first and second links L1 and L2 of the core equipments EC1 and EC2. Once the peripheral equipment EP has received the LACP-PDU packets and the two personal identifiers over the first and second physical links L1 and L2, respectively, it alerts its link aggregation module MAL in order for it to terminate the aggregate consisting of the first and second physical links L1 and L2. This is because there is no reason for this link to exist further because the first and second core equipments EC1 and EC2 no longer constitute a virtual group following the interruption of the third physical link L3. This situation is shown diagrammatically in FIG. 2.

Figure 2:
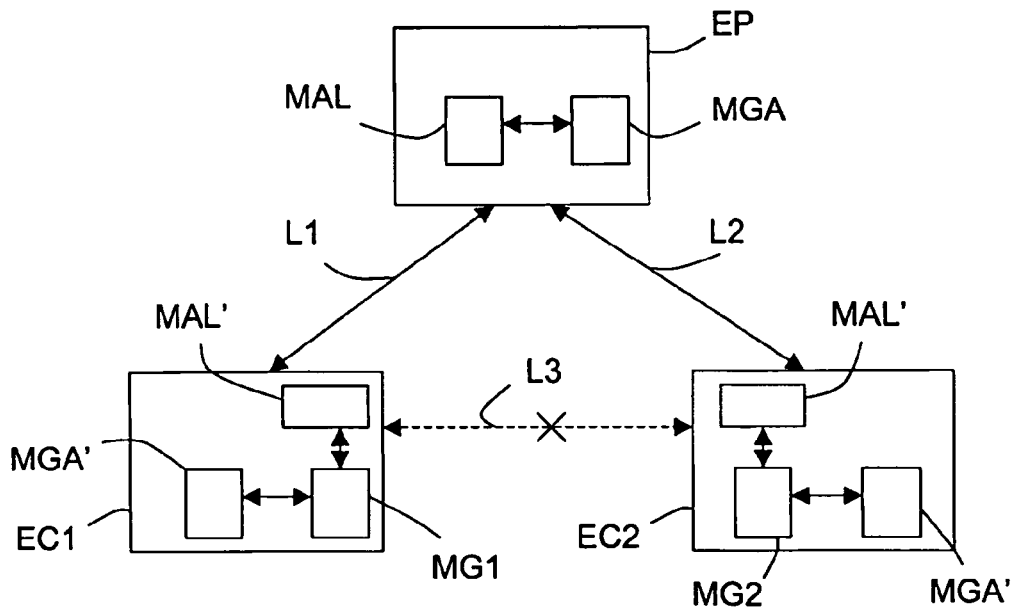
FIG. 2 shows the FIG. 1 network in the presence of an interruption of a link between the two core equipments.

To avoid loops, in particular when transmitting data in broadcast mode, the peripheral equipment EP, as shown in FIGS. 1 and 2, may also be equipped with an auxiliary management module MGA for implementing the spanning tree or rapid reconfiguration technique described in the introduction. It can therefore place the port of one of the first and second physical links L1 and L2 in a blocking state, the other physical link being then placed in a transmission (non-blocking) state. This is useful in particular before any aggregation of links has taken place.

If the link aggregation module MAL of the peripheral equipment EP has established an aggregate of links following the reception of a common identifier defining a virtual group of core equipments EC1 and EC2, its auxiliary management module MGA goes immediately to a transmission mode authorizing the transmission of data over the first and second physical links L1 and L2. It therefore remains active, which enables it, as soon as an aggregate is eliminated, to determine the physical transmission link and the physical link containing a blocked port.

Figure 3:
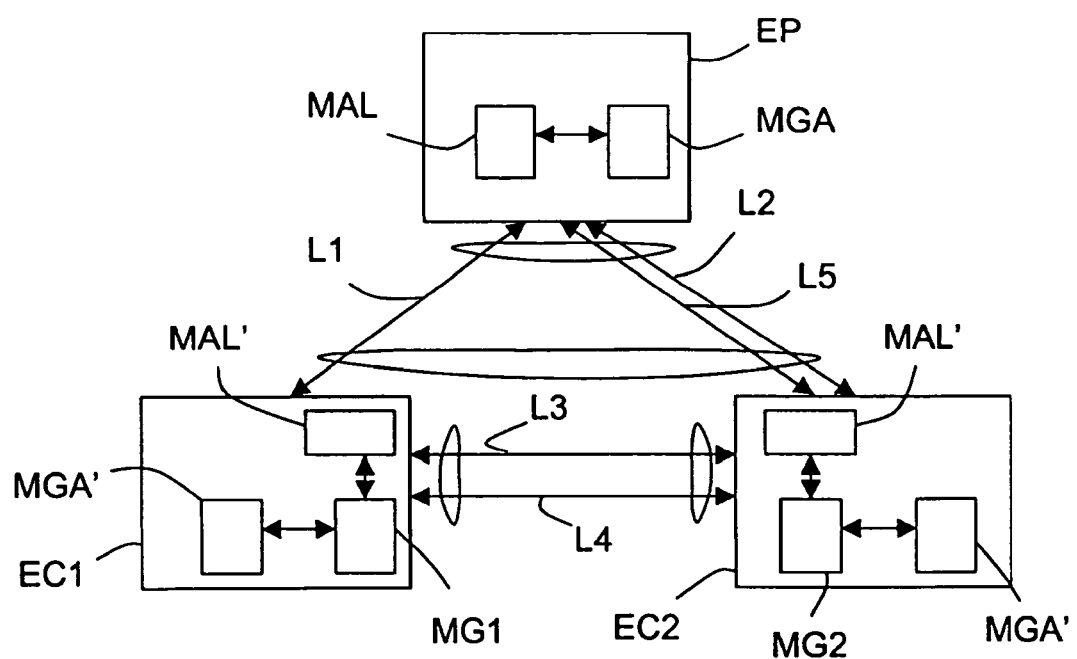
FIG. 3 is a diagram of a portion of a second example of a local area network of the invention.

As indicated above and as shown in FIG. 3, the first and second core equipments EC1 and EC2 may also be connected to each other by at least one fourth physical link L4. In this case it is advantageous for them each to include an auxiliary management module MGA' (implementing a spanning tree type technique) of the same type as the module (MGA) that may be installed in the peripheral equipment EP. Thanks to these auxiliary management modules MGA', they can manage access to the third and fourth physical links L3 and L4.

If the link aggregation modules MAL' of the core equipments EC1 and EC2 have established an aggregate of links with the third and fourth physical links L3 and L4, their auxiliary management modules MGA' are placed immediately in a transmission mode authorizing the transmission of data over the third and fourth physical links L3 and L4. They therefore both remain active, enabling them, immediately the aggregate is eliminated, to determine the transmission physical link and the physical link containing the blocked port.

The peripheral equipment EP may be connected to at least one of the core equipments EC1, EC2 by a plurality of physical links. This is the case in FIG. 3 in particular, in which the peripheral equipment EP is connected to the second core equipment EC2 by the second physical link L2 and by a fifth physical link L5.

The management modules MG1 and MG2, auxiliary management modules MGA and MGA', and link aggregation modules MAL and MAL' may be implemented in the form of electronic circuits, software (or data processing) modules, or a combination of circuits and software.

The invention is not limited to the embodiments of core equipment, peripheral equipment and a local area network described above by way of example only, and encompasses all variants that the person skilled in the art might envisage that fall within the scope of the following claims.

There is claimed:

1. A local area network comprising at least one peripheral equipment adapted to effect layer 2 switching and including physical link aggregation means, and at least first and second core equipments adapted to effect layer 2 switching and including physical link aggregation means, said peripheral equipment being connected to said first and second core equipments respectively by at least first and second physical links, and said first and second core equipments being connected to each other by at least one third physical link, in which network said first and second core equipments respectively comprise first and second management means each adapted to detect the presence of the core equipment in which they are not installed via said third physical link coupling them and in the event of mutual detection to instruct the transmission of a common identifier to said peripheral equipment so that it considers said first and second core equipments as a single layer 2 switch and its aggregation means aggregate said first and second physical links with said aggregation means of said first and second core equipments.

2. The network claimed in claim 1 wherein said common identifier is predetermined.

3. The network claimed in claim 2 wherein said predetermined common identifier is stored in a memory of each of said first and second management means.

4. The network claimed in claim 2 wherein, in the absence of detection, said first and second management means are each adapted to instruct the transmission to said peripheral equipment of the personal identifier of the core equipment in which they are respectively installed.

5. The network claimed in claim 4 wherein said first and second core equipments are also connected by at least one fourth physical link and are each equipped with auxiliary management means adapted to implement a spanning tree type technique to manage access to said third and fourth physical links and in the event of aggregation of the third and fourth physical links by said aggregation means of said first and second core equipments said auxiliary management means of said first and second core equipments are adapted to be placed in a "transmission" mode authorizing the transmission of data over said third and fourth physical links.

6. The network claimed in claim 2 wherein at least said peripheral equipment is equipped with auxiliary management means appropriate to implementing a spanning tree type technique to manage access to said first and second physical links and in the event of an aggregate of links being established after the reception of a common identifier to place itself in a "transmission" mode authorizing the transmission of data over said first and second physical links.

7. The network claimed in claim 2 wherein said first and second core equipments are also connected by at least one fourth physical link and are each equipped with auxiliary management means adapted to implement a spanning tree type technique to manage access to said third and fourth physical links and in the event of aggregation of the third and fourth physical links by said aggregation means of said first and second core equipments said auxiliary management means of said first and second core equipments are adapted to be placed in a "transmission" mode authorizing the transmission of data over said third and fourth physical links.

8. The network claimed in claim 1 wherein said first and second management means are adapted, in the event of mutual detection, to carry out a negotiation procedure for conjointly determining said common identifier.

9. The network claimed in claim 8 wherein, in the absence of detection, said first and second management means are each adapted to instruct the transmission to said peripheral equipment of the personal identifier of the core equipment in which they are respectively installed.

10. The network claimed in claim 8 wherein at least said peripheral equipment is equipped with auxiliary management means appropriate to implementing a spanning tree type technique to manage access to said first and second physical links and in the event of an aggregate of links being established after the reception of a common identifier to place itself in a "transmission" mode authorizing the transmission of data over said first and second physical links.

11. The network claimed in claim 8 wherein said first and second core equipments are also connected by at least one fourth physical link and are each equipped with auxiliary management means adapted to implement a spanning tree type technique to manage access to said third and fourth physical links and in the event of aggregation of the third and fourth physical links by said aggregation means of said first and second core equipments said auxiliary management means of said first and second core equipments are adapted to be placed in a "transmission" mode authorizing the transmission of data over said third and fourth physical links.

12. The network claimed in claim 1 wherein, in the absence of detection, said first and second management means are each adapted to instruct the transmission to said peripheral equipment of the personal identifier of the core equipment in which they are respectively installed.

13. The network claimed in claim 12 wherein at least said peripheral equipment is equipped with auxiliary management means appropriate to implementing a spanning tree type technique to manage access to said first and second physical links and in the event of an aggregate of links being established after the reception of a common identifier to place itself in a "transmission" mode authorizing the transmission of data over said first and second physical links.

14. The network claimed in claim 12 wherein said first and second core equipments are also connected by at least one fourth physical link and are each equipped with auxiliary management means adapted to implement a spanning tree type technique to manage access to said third and fourth physical links and in the event of aggregation of the third and fourth physical links by said aggregation means of said first and second core equipments said auxiliary management means of said first and second core equipments are adapted to be placed in a "transmission" mode authorizing the transmission of data over said third and fourth physical links.

15. The network claimed in claim 1 wherein at least said peripheral equipment is equipped with auxiliary management means appropriate to implementing a spanning tree type technique to manage access to said first and second physical links and in the event of an aggregate of links being established after the reception of a common identifier to place itself in a "transmission" mode authorizing the transmission of data over said first and second physical links. over said first and second physical links.

16. The network claimed in claim 1 wherein said first and second core equipments are also connected by at least one fourth physical link and are each equipped with auxiliary management means adapted to implement a spanning tree type technique to manage access to said third and fourth physical links and in the event of aggregation of the third and fourth physical links by said aggregation means of said first and second core equipments said auxiliary management means of said first and second core equipments are adapted to be placed in a "transmission" mode authorizing the transmission of data over said third and fourth physical links.

17. The network claimed in claim 1 wherein said first and second core equipments are layer 2 switches.

18. The network claimed in claim 1 wherein said first and second core equipments are switches/routers.

19. The network claimed in claim 1 wherein said peripheral equipment is a layer 2 switch.

* * * * *